United States Patent
Tseng et al.

(10) Patent No.: US 11,804,793 B2
(45) Date of Patent: Oct. 31, 2023

(54) METHOD OF SPEED CONTROL BASED ON SELF-LEARNING MODEL OF LOAD TORQUE AND MOMENT INERTIA

(71) Applicant: DELTA ELECTRONICS, INC., Taoyuan (TW)

(72) Inventors: Shao-Kai Tseng, Taoyuan (TW); Pai-En Cheng, Taoyuan (TW); Chen-Yeh Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/546,563

(22) Filed: Dec. 9, 2021

(65) Prior Publication Data
US 2022/0393626 A1    Dec. 8, 2022

(30) Foreign Application Priority Data
Jun. 2, 2021   (CN) .......................... 202110613138.9

(51) Int. Cl.
*H02P 21/00*   (2016.01)
*H02P 21/20*   (2016.01)
*H02P 21/14*   (2016.01)

(52) U.S. Cl.
CPC ........ *H02P 21/0017* (2013.01); *H02P 21/143* (2013.01); *H02P 21/20* (2016.02)

(58) Field of Classification Search
CPC ..... H02P 21/0017; H02P 21/20; H02P 21/143
See application file for complete search history.

(56) References Cited

U.S. PATENT DOCUMENTS

| | | | | |
|---|---|---|---|---|
| 7,057,366 B1* | 6/2006 | Tsai | ..................... | G05B 13/042 318/560 |
| 2007/0150076 A1* | 6/2007 | Schmidt | ............... | G05B 13/042 700/29 |
| 2013/0047724 A1* | 2/2013 | Tamminen | ............ | F04D 27/001 73/489 |
| 2013/0300333 A1* | 11/2013 | Sako | ....................... | H02P 7/295 318/490 |
| 2016/0229446 A1* | 8/2016 | Tamaizumi | ............ | B62D 6/002 |
| 2017/0040916 A1* | 2/2017 | Yoshiura | ................. | H02P 29/10 |
| 2017/0146971 A1* | 5/2017 | Ono | ..................... | G05B 19/402 |
| 2017/0153609 A1* | 6/2017 | Namie | ................. | G05B 13/026 |
| 2019/0158006 A1* | 5/2019 | Yoshiura | ................. | H02P 21/13 |
| 2021/0054554 A1* | 2/2021 | Xu | ........................ | G05B 19/416 |

FOREIGN PATENT DOCUMENTS

| | | |
|---|---|---|
| CN | 103338003 A | 10/2013 |
| CN | 111498620 A * | 8/2020 |

OTHER PUBLICATIONS

Machine translation CN 111498620 A (Year: 2020).*

* cited by examiner

*Primary Examiner* — Kawing Chan
(74) *Attorney, Agent, or Firm* — MUNCY, GEISSLER, OLDS & LOWE, P.C.

(57) ABSTRACT

A method of speed control based on a self-learning model of load torque and a moment inertia is applied to a controller of controlling a motor. The method includes steps of: establishing a relationship between the load torque and the moment inertia by a self-learning manner, correspondingly acquiring a value of the moment inertia according to a value of the load torque, and adjusting parameters of the controller to control rotation of the motor according to the value of the moment inertia.

9 Claims, 5 Drawing Sheets

METHOD OF SPEED CONTROL BASED ON SELF-LEARNING MODEL OF LOAD TORQUE AND MOMENT INERTIA

BACKGROUND

Technical Field

The present disclosure relates to a method of speed control, and more particularly to a method of speed control based on self-learning model of a load torque and a moment inertia.

Description of Related Art

The statements in this section merely provide background information related to the present disclosure and do not necessarily constitute prior art.

The application of motors with inverters has been widely used in elevators, cranes, escalators, and other systems. In order to increase the operation performance of a drive system, the relevant mechanical parameters of the drive system are generally used to design a speed controller to meet the performance requirements during operation.

Taking an elevator as a load as an example, since the moment inertia of the motor is positively related to the weight of the load, the moment inertia of the motor will accordingly change when the weight of the load is different. Therefore, if the moment inertia of the motor can be estimated, the parameters of the controller of the motor can be adjusted according to the estimated value of the moment inertia, which helps to precisely control the speed of the motor to increase the control performance of the motor, such as the acceleration performance, transient response, load rejection capability, and so on.

SUMMARY

An object of the present disclosure is to provide a method of speed control based on a self-learning model of a load torque and a moment inertia to solve the problems of the existing technology.

In order to achieve the above-mentioned object, the method of speed control based on a self-learning model of the load torque and the moment inertia applied to a controller of controlling a motor. The method includes steps of: (a) establishing a relationship between the load torque and the moment inertia by a self-learning manner, (b) correspondingly acquiring a value of the moment inertia according to a value of the load torque, and (c) adjusting parameters of the controller to control rotation of the motor according to the value of the moment inertia.

In one embodiment, the step (a) includes steps of: (a1) acquiring the value of the load torque under a zero speed control, (a2) acquiring the value of the moment inertia under an acceleration control, and (a3) establishing the relationship between the load torque and the moment inertia by repeatedly performing the step (a1) and the step (a2).

In one embodiment, the step (a2) includes a step of: (a21) calculating the value of the moment inertia by performing an integral operation.

In one embodiment, the relationship between the load torque and the moment inertia is a lookup table.

In one embodiment, the relationship between the load torque and the moment inertia is a curve-fitting relation.

In one embodiment, the method further includes a step of: (d) updating the relationship between the load torque and the moment inertia.

In one embodiment, when determining that there is a new value of the load torque, correspondingly acquiring a new value of the moment inertia and updating the relationship between the load torque and the moment inertia.

In one embodiment, a relationship between the load torque and the moment inertia is one to one.

In one embodiment, when a relationship between the load torque and the moment inertia is one to many, the plurality of moment inertia is calculated by an arithmetic average operation to acquire an average moment inertia, and a relationship between the load torque and the average moment inertia is one to one.

In one embodiment, in the step (a), acquiring a speed information of the motor through a speed control loop, and acquiring a torque information of the motor through a current control loop to self-learning establish the relationship between the load torque and the moment inertia.

Accordingly, the method of speed control based on the self-learning model of the load torque and the moment inertia can achieve the technical effects: (1) calculating the value of the corresponding values of the moment inertia by using an integral operation to solve the problem of needing to add a filter due to the high frequency noise caused by the differential operation in the prior art; (2) using the existing speed control loop and current control loop to directly acquire the information needed for parameter estimation, and therefore the parameter (moment inertia) estimation process does not affect the operation of the closed loop and the drive control of the motor; (3) when the value of the moment of inertia is acquired by parameter estimation, the parameters of the controller can be adjusted according to the value of the moment inertia to control the operation of the motor, thereby precisely controlling the speed of the motor to increase the control performance of the motor, such as the acceleration performance, transient response, load rejection capability, and so on.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
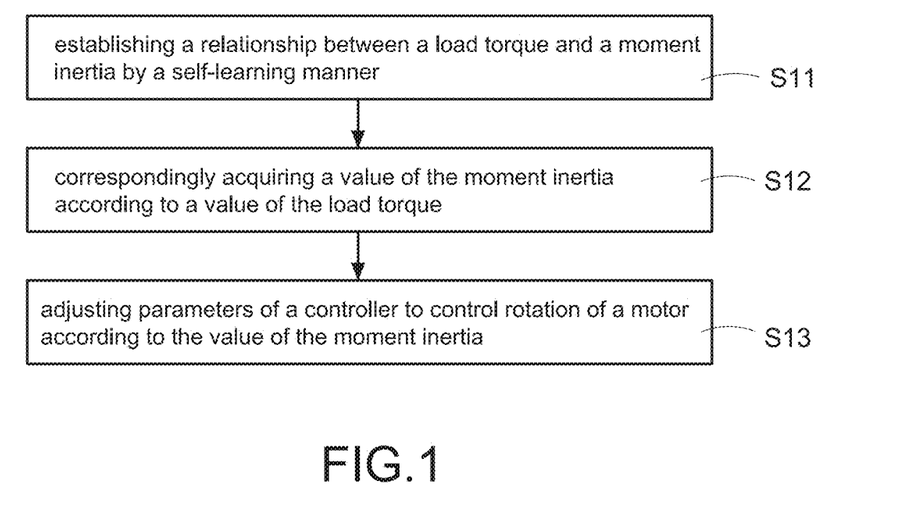
FIG. 1 is a flowchart of a method of speed control based on a self-learning model of a load torque and a moment inertia according to the present disclosure.

Please refer to FIG. 1, which shows a flowchart of a method of speed control based on a self-learning model of a load torque and a moment inertia according to the present disclosure. The method of speed control (speed control method) is applied to a controller of controlling a motor, and the controller may also be referred to as a speed controller. The method of speed control includes steps of: first, establishing a relationship between the load torque and the moment inertia by a self-learning manner (S11).

Figure 2:
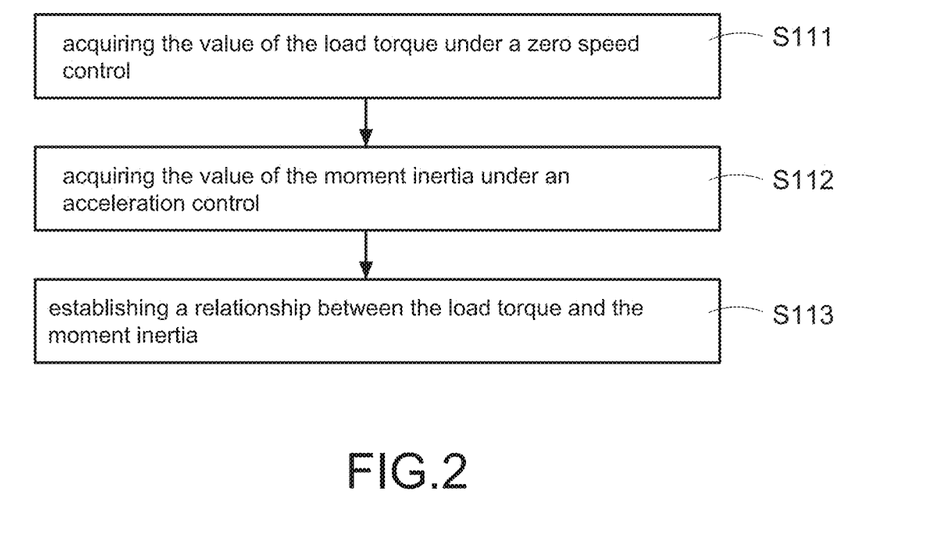
FIG. 2 is a flowchart of self-learning establishing a relationship between the load torque and the moment inertia according to the present disclosure.

Please refer to FIG. 2, in the step (S11), a value of the load torque and a value of the moment inertia may be acquired (estimated) according to different mechanical motion characteristics of the motor with zero speed and acceleration. Specifically, the step (S11) includes the following steps of: acquiring (estimating) a value of the load torque under a zero speed control (S111). Afterward, acquiring (estimating) a value of the moment inertia under an acceleration control (S112). Finally, establishing a relationship between the load torque and the moment inertia (S113) by repeatedly performing the step (S111) and the step (S112). The specific description is as follows.

A motor mechanical motion equation may be expressed as the relational formula (1):

$$J_m \frac{d}{dt}\omega_m = T_e - T_L - B_m\omega_m \quad (1)$$

In the relational formula (1), $J_m$, is the moment inertia, $\omega_m$ is a mechanical angular velocity (and a mechanical angular acceleration is $$\left.\frac{d}{dt}\omega_m\right), T_e$$

is a motor output torque, $T_L$ is the load torque, and $B_m$ is a viscous friction coefficient.

The relational formula (1) is further represented as:

$$J_m d\omega_m = (T_e - T_L - B_m\omega_m)dt \quad (2)$$

The relational formula (2) is further integrated to be represented as:

$$J_m\omega_m = \int(T_e - T_L - B_m\omega_m)dt \quad (3)$$

Therefore, the relation formula (3) is further represented as an estimation equation of moment inertia:

$$J_m^{Est} = \frac{\int(T_e - T_L - B_m\omega_m)dt}{\omega_m} \quad (4)$$

For an elevator system, due to $J_m$, >>$B_m$, the estimation equation of moment inertia can be simplified as:

$$J_m^{Est} = \frac{\int(T_e - T_L)dt}{\omega_m} \quad (5)$$

Figure 3:
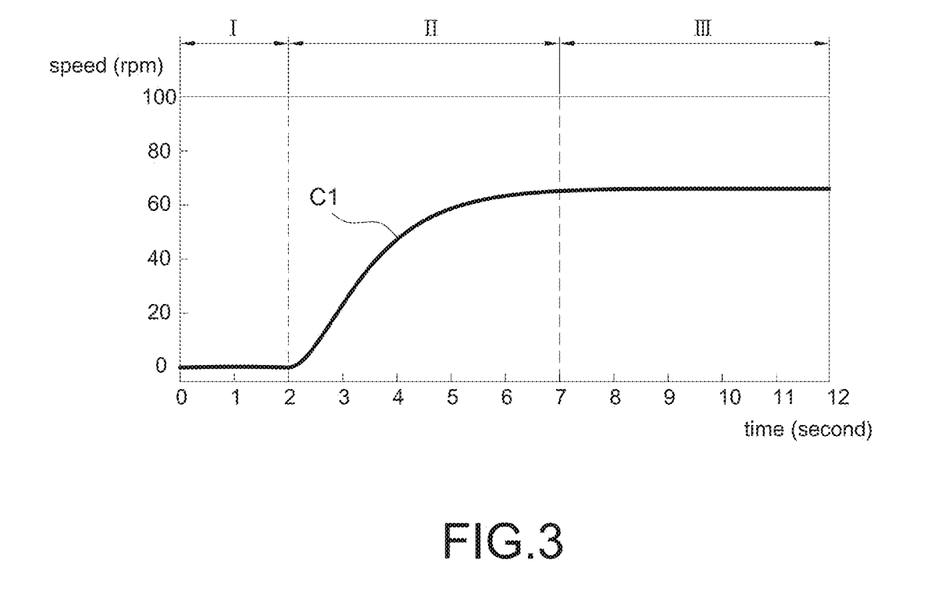
FIG. 3 is a schematic curve diagram of a speed change of a motor according to the present
Figure 4:
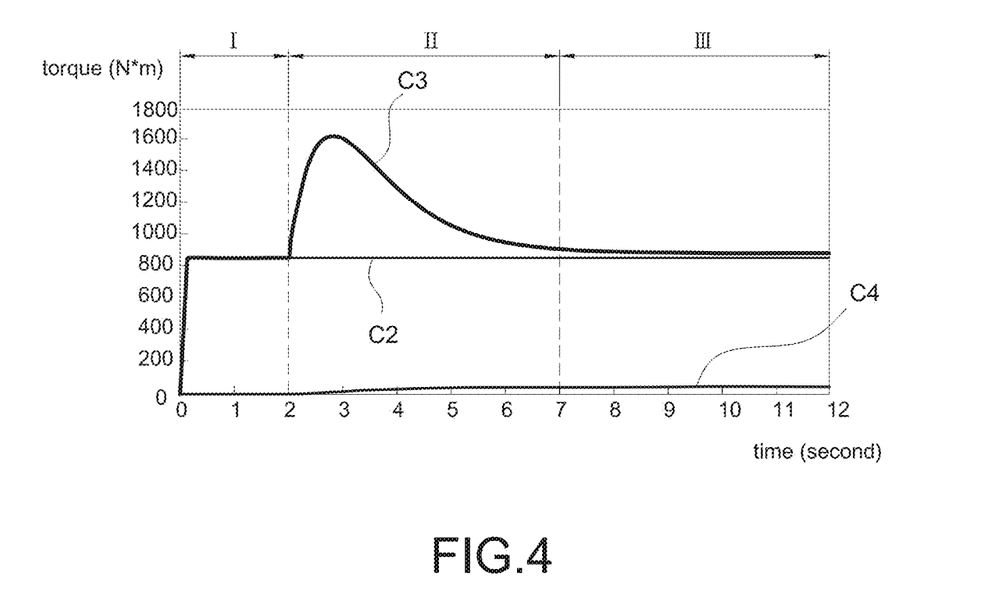
FIG. 4 is a schematic curve diagram of an output torque and a load torque of the motor according to the present disclosure.

Please refer to FIG. 3 and FIG. 4, the estimation of the load torque $T_L$ is represented in a first interval (I), the estimation of moment inertia is represented in a second interval (II), and the estimation of the viscous friction coefficient $B_m$ is represented in a third interval (III). The specific description is as follows.

As mentioned in the step (S111) above, the value of the load torque is acquired (estimated) under the zero speed control. In the first interval (I), i.e., the zero speed control (a motor speed curve C1 is zero shown in FIG. 3) is between zero second and $2^{nd}$ second shown in FIG. 3 and FIG. 4, and the value of the load torque $T_L$ can be acquired (estimated), and the value of the load torque $T_L$ is equal to a value of the motor output torque $T_e$, which is equal to a product of a motor output current ($i_q$) and a torque constant ($K_t$), i.e., $T_e = i_q * K_t$. As shown in FIG. 4, a load torque curve C2 and a motor output torque curve C3 are overlapped in the first interval (I). For example, when the door of the elevator is closed, a mechanical brake action is performed. When the mechanical brake is released, the elevator will be controlled at zero speed, that is, the speed of the elevator will be controlled to zero. When the speed is zero (i.e., $\omega_m=0$), the product of the viscous friction coefficient $B_m$ and the speed $\omega_m$ is zero (i.e., $B_m\omega_m=0$), and the mechanical angular acceleration $$\frac{d}{dt}\omega_m$$

is also zero. Therefore, the value of the load torque $T_L$ can be acquired (estimated) to be equal to the motor output torque $T_e$ (=$i_q*K_t$) according to the relational formula (1). Therefore, in the first interval (I), i.e., a zero-speed control interval, the value of the load torque $T_L$ can be acquired (estimated), which is corresponding to the step (S111) in FIG. 2.

Afterward, as mentioned in the step (S112) above, the value of the moment inertia is acquired (estimated) under the acceleration control. In the second interval (II), i.e., the acceleration speed control (the motor speed curve C1 gradually rises shown in FIG. 3) is between $2^{nd}$ second and $7^{th}$ second shown in FIG. 3 and FIG. 4, and the value of the moment inertia $J_m$, can be acquired (estimated). As shown in FIG. 4, in the early stage of acceleration (namely, from standstill to acceleration), in order to overcome the moment inertia, an additional motor output torque $T_e$ is required, that is, the motor output torque curve C3 sharply increases in the initial acceleration period. After the moment inertia is overcome, the motor output torque curve C3 significantly drops. Therefore, in the second interval (II), i.e., an acceleration control interval, the value of the moment inertia $J_m$, can be acquired (estimated) by integrating a difference between the motor output torque $T_e$ and the load torque $T_L$, and then dividing by the mechanical angular velocity $\omega_m$ according to the relational formula (5).

Therefore, the relationship between the load torque and the moment inertia can be built by repeatedly performing the step (S111) and the step (S112).

Incidentally, in the third interval (III), between $7^{th}$ second and $12^{th}$ second as shown in FIG. 3 and FIG. 4, since the motor runs at almost constant angular velocity, the mechanical angular acceleration $$\frac{d}{dt}\omega_m$$

is zero. Therefore, the value of the viscous friction coefficient $B_m$ can be acquired (estimated) by integrating the difference between the motor output torque $T_e$ and the load torque $T_L$, and then dividing by the mechanical angular velocity $\omega_m$ according to the relational formula (5). In particular, the curve C4 shown in FIG. 4 represents a product of the viscous friction coefficient $B_m$ and the mechanical angular velocity $\omega_m$.

Therefore, after the step (S11) is performed, the relationship between the load torque and the moment inertia can be self-learning built. In one embodiment, the relationship between the load torque and the moment inertia may be a lookup table, and the lookup table is created (provided) by corresponding a value of load torque to at least one value of the moment inertia. Incidentally, during the creation of the relationship between the load torque and the moment inertia, there may be one value of load torque corresponding to more than two values of moment inertia. Therefore, the plural values of the moment inertia may be calculated by an arithmetic average operation to acquire an average moment inertia to correspond to the value of the load torque. The examples of the lookup table are shown in Table 1 and Table 2 below.

TABLE 1

| load torque $T_L$ | estimated moment inertia $J_m^{Est}$ |
| --- | --- |
| $T_{L1}$ | $J_{m1}$ |
| $T_{L2}$ | $J_{m2}$ |
| $T_{L3}$ | $J_{m3}$ |
| . | . |
| . | . |
| . | . |
| $T_{Ln}$ | $J_{mn}$ |

As shown in FIG. 1, a relationship between the load torque $T_L$ and the moment inertia $J_m^{Est}$ is one to one. That is, when the value of the load torque $T_L$ is equal to $T_{L1}$, the value of the estimated moment inertia $J_m^{Est}$ can be acquired to be equal to $J_{m1}$ by the lookup table. Similarly, when the value of the load torque $T_L$ is equal to $T_{L3}$, the value of the estimated moment inertia $J_m^{Est}$ can be acquired to be equal to $J_{m3}$ by the lookup table.

TABLE 2

| load torque $T_L$ | estimated moment inertia $J_m^{Est}$ | | | | average estimated moment inertia $J_{m\text{-}avg}^{Est}$ |
| --- | --- | --- | --- | --- | --- |
| $T_{L1}$ | $J_{m11}$ | $J_{m12}$ | ... | $J_{m1k}$ | $J_{m1\text{-}avg}$ |
| $T_{L2}$ | $J_{m21}$ | $J_{m22}$ | ... | $J_{m2k}$ | $J_{m2\text{-}avg}$ |
| $T_{L3}$ | $J_{m31}$ | $J_{m32}$ | ... | $J_{m3k}$ | $J_{m3\text{-}avg}$ |
| . | . | . | ... | . | . |
| . | . | . | | . | . |
| . | . | . | | . | . |
| $T_{Ln}$ | $J_{mn1}$ | $J_{mn2}$ | ... | $J_{mnk}$ | $J_{mn\text{-}avg}$ |

As shown in FIG. 2, since one load torque $T_L$ corresponds plural values of the estimated moment inertia $J_m^{Est}$, for example, during the process of self-learning establishing the relationship between the load torque and the moment inertia, a plurality of values of the estimated moment inertia $J_m^{Est}$, such as $J_{m31}, J_{m32}, \ldots, J_{m3k}$ are acquired in estimations for the same load torque $T_{L3}$. Therefore, the plurality of values of the estimated moment inertia $J_m^{Est}$, such as $J_{m31}, J_{m32}, \ldots, J_{m3k}$ are averaged to acquire an average estimated moment inertia $J_{m\text{-}avg}^{Est}$ so that a relationship between the load torque $T_L$ and the average estimated moment inertia $J_{m\text{-}avg}^{Est}$ is one to one. Therefore, when the value of the load torque $T_L$ is equal to $T_{L3}$, the value of the average estimated moment inertia $J_{m\text{-}avg}^{Est}$ can be acquired to be equal to $J_{m3\text{-}avg}$ by the lookup table. Incidentally, the abnormal (unreasonable) value(s) of the estimated moment inertia $J_m^{Est}$ that is/are obviously too high or too low will be deleted first, and the remaining values of the estimated moment inertia $J_m^{Est}$ are averaged to accurately acquire the average estimated moment inertia $J_{m\text{-}avg}^{Est}$.

Figure 5:
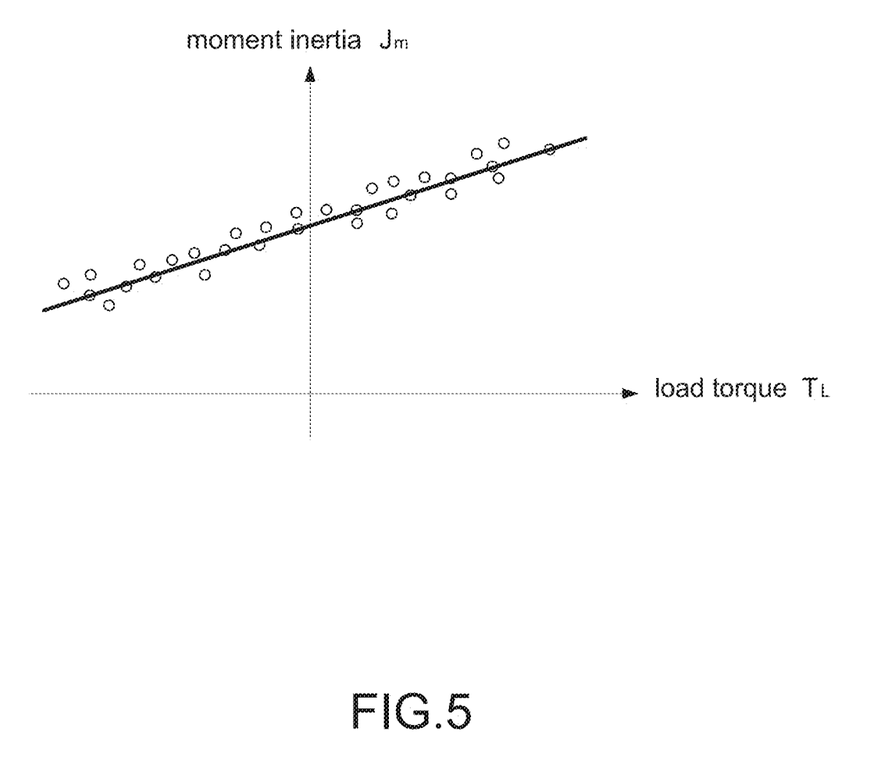
FIG. 5 is a schematic curve-fitting relation of the relationship between the load torque and the moment inertia according to the present disclosure.

In another embodiment, the relationship between the load torque and the moment inertia is a curve-fitting relation as shown in FIG. 5.

The sampled (acquired) values of discrete load torque $T_L$ (the abscissa of FIG. 5) are provided to represent a relationship between the value of the moment inertia $J_m$, and the load torque $T_L$ by a continuous mathematical function (linear equation) (the ordinate of FIG. 5). Therefore, the values of the moment inertia $J_m$, can be acquired through the known (sampled) values of the load torque $T_L$.

The forms or data processing methods of the above-mentioned lookup table or curve-fitting relation may be planned and designed according to the hardware conditions, such as memory capacity, microprocessor operation speed, networking capability, or so on so that the data resolution of the lookup table or the complexity of the curve-fitting relation may be used for the optimal and most real-time estimation performance.

Based on the creation of the relationship between the load torque and the moment inertia, after the step (S11), correspondingly acquiring a value of the moment inertia according to the value of the load torque (S12). Since the relationship between the load torque and the moment inertia is created in the step (S11), the value of the moment inertia can be acquired according to the value of the load torque by the lookup table. Alternatively, by using the curve-fitting relation, the value of the load torque is substituted into the fitted mathematical function to calculate the corresponding value of the moment inertia. Finally, adjusting parameters of the controller to control rotation of the motor according to the value of the moment inertia (S13).

Figure 6:
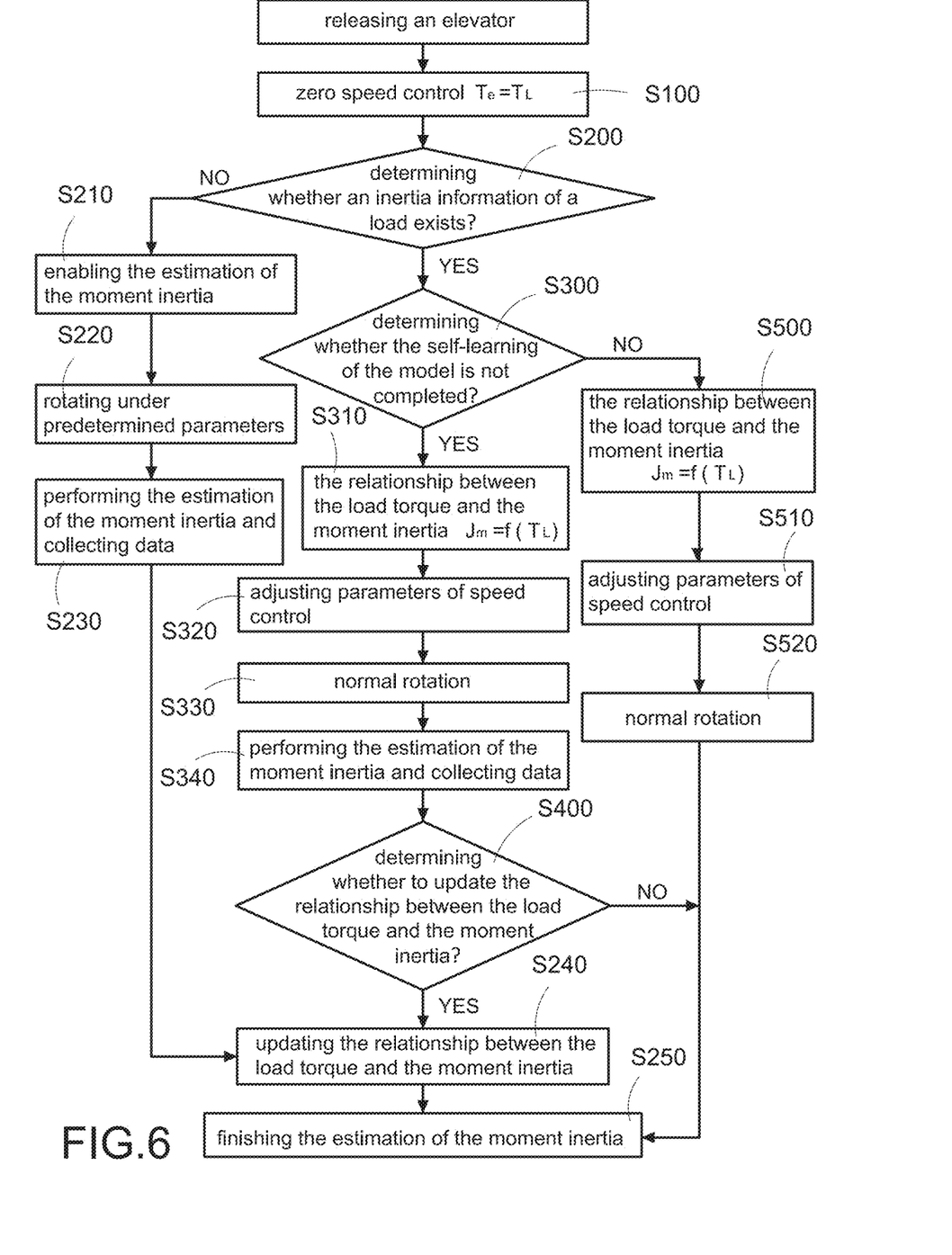
FIG. 6 is a flowchart of speed control application based on the self-learning model of the load torque and the moment inertia according to the present disclosure.

Please refer to FIG. 6, which shows a flowchart of speed control application based on the self-learning model of the load torque and the moment inertia according to the present disclosure. After the elevator is built up, a zero speed control is used to estimate the value of the load torque $T_L$, that is, the load torque $T_L$ is equal to the motor output torque $T_e$ (S100), which is corresponding to the detailed descriptions in the step (S111) shown in FIG. 2 and the operations in the first interval (I) shown in FIG. 3 and FIG. 4, and the detail description is omitted here for conciseness. Afterward, determining whether an inertia information of the load exists (S200), that is, determining whether the information of the moment inertia of the motor exists. Afterward, enabling (starting) the estimation of the moment inertia (S210) if the information of the moment inertia does not exist so that the motor runs under predetermined parameters (S220), and performing the estimation of the moment inertia and collecting data (S230). According to the detailed descriptions in the step (S112) shown in FIG. 2 and the operations in the second interval (II) shown in FIG. 3 and FIG. 4, the value of the moment inertia can be acquired (estimated) by an acceleration control. Therefore, through the performance of the steps (S210) to (S230), the information of the relationship between the load torque and the moment inertia can be obtained, which may be regarded as initially establishing the relationship between the load torque and the moment inertia. Therefore, updating the established relationship between the load torque and the moment inertia (S240) by the lookup table or the curve-fitting relation to make the relationship between the load torque and the moment inertia more complete.

Moreover, if a determination result in the step (S200) is "YES", that is, the inertia information of the load exists, determining whether the self-learning of the model is not completed (S300). If the self-learning of the model has been completed, that is, a determination result in the step (S300) is "NO", correspondingly acquiring different values of the moment inertia $J_m$, according to different values of the load torque $T_L$ (the example, the number of passengers in the elevator) by the lookup table or the curve-fitting relation (S500). Moreover, adjusting parameters of the controller of the motor to control rotation of the motor according to the values of the moment inertia $J_m$, that is, performing the speed control of the motor (S510) to control rotation of the motor (S520), thereby precisely controlling the speed of the motor to increase the control performance of the motor. Therefore, through the performance of the steps (S500) to (S520), it may be regarded as a state where the relationship between the load torque and the moment inertia does not need to be updated, and different values of the corresponding moment inertia $J_m$, are acquired according to different values of the load torque $T_L$ so as to adjust parameters of the controller of the motor to control rotation of the motor.

If the self-learning of the model has not been completed, that is, the determination result in the step (S300) is "YES", correspondingly acquiring different values of the moment inertia $J_m$ according to different values of the load torque $T_L$ (the example, the number of passengers in the elevator) by the lookup table or the curve-fitting relation (S310). Moreover, adjusting parameters of the controller of the motor to control rotation of the motor according to the values of the moment inertia $J_m$, that is, performing the speed control of the motor (S320) to control rotation of the motor (S330), and continuously performing the estimation of the moment inertia and collecting data (S340). Therefore, through the performance of the steps (S310) to (S340), it may be regarded as the data (the information of the load torque) of the relationship between the load torque and the moment inertia still need to be collected and updated. Furthermore, if there is new information of the load torque $T_L$ (for example, there is a change in the weight of passengers in the elevator), a new load torque $T_L$ is correspondingly estimated so as to update/new the relationship between the load torque and the moment inertia. That is, if a determination result in the step (S400) is "YES" to update the relationship between the load torque and the moment inertia (S240) so that the relationship between the load torque and the moment inertia is more complete. On the contrary, if the relationship between the load torque and the moment inertia does not need to be updated, that is the determination result in the step (S400) is "NO", finishing the estimation of the moment inertia (S250).

Figure 7:
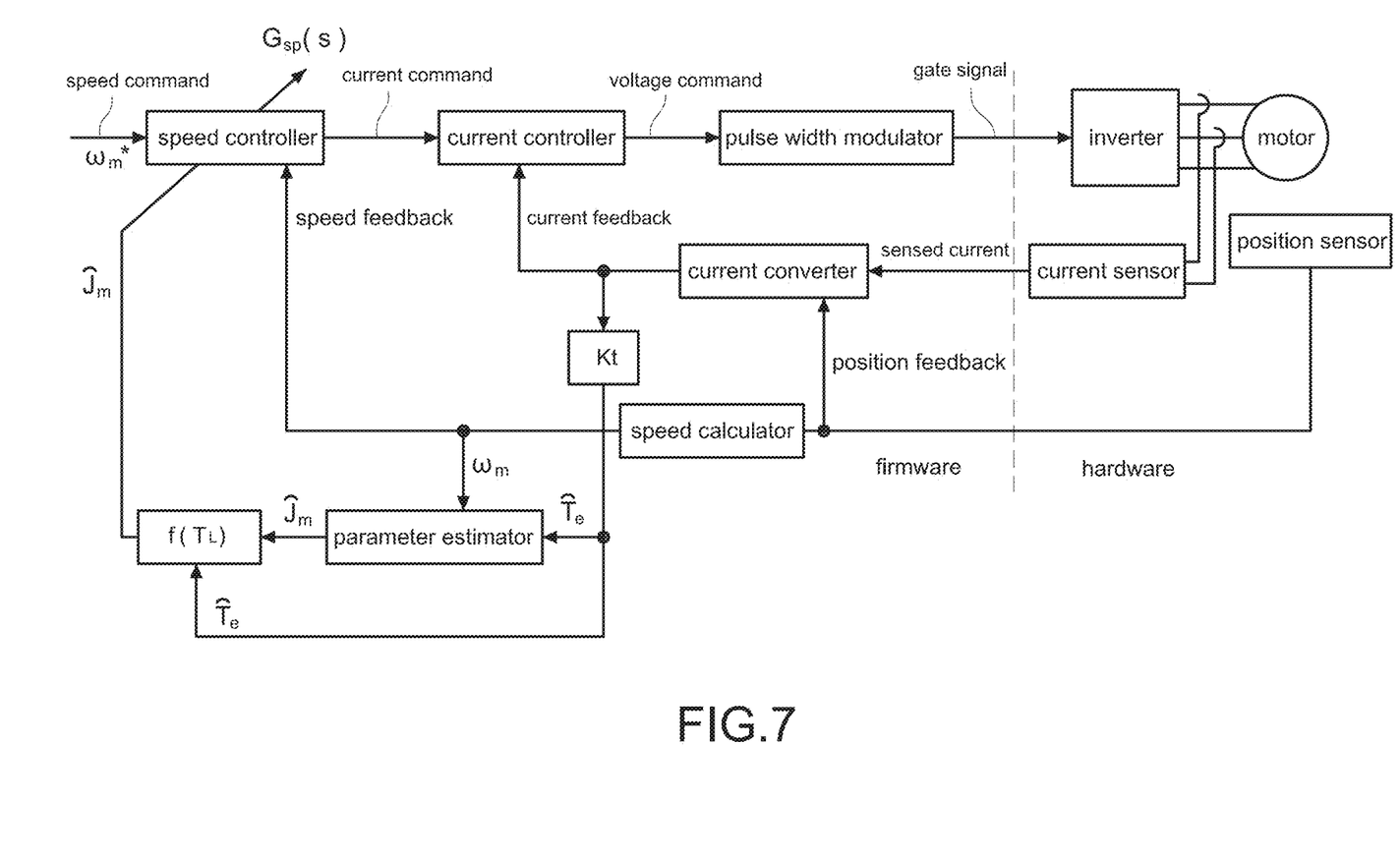
FIG. 7 is a block diagram of a motor drive system according to the present disclosure.

Please refer to FIG. 7, which shows a block diagram of a motor drive system according to the present disclosure. The motor drive system includes the architecture of hardware and firmware (or software) required for motor drive. In this motor drive system, an outer-loop control (i.e., a speed control for controlling the speed of the motor) and an inner-loop (i.e., a current control for controlling the output of the motor) are provided. In the outer-loop control, a speed controller receives a speed command $\omega_m^*$ provided from a host computer, that is, a command of controlling the speed of the elevator (corresponding to the speed of the motor) is received. With a position feedback information provided by a position sensor, the actual speed of the elevator (corresponding to the actual speed of the motor) can be calculated through a speed calculator, and the speed information is fed back to the speed controller. Therefore, a current command, namely an equivalent torque command can be acquired according to the speed command $\omega_m^*$ and the fed speed information.

A current controller receives the current command and a current feedback of a sensed current measured by a current sensor of an inner-loop control loop to generate a voltage command. In particular, the sensed current is converted into the current feedback by a current converter, and the current converter can convert an a-b-c three-phase stationary coordinate to a d-q synchronous rotation coordinate. The voltage command is modulated and processed by a PWM modulator (pulse width modulator) to generate a gate signal to control an inverter to drive the motor.

In addition, the motor drive system further includes a parameter estimator. The parameter estimator is connected to an outer-loop control loop to receive a motor angular velocity $\omega_m$, and is connected to the inner-loop control loop to receive an estimated value of the motor output torque $\hat{T}_e$ according to the product of an motor output current $i_q$ and a torque constant $K_t$. The parameter estimator estimates the value of the moment inertia $J_m$ based on the received motor parameter information.

In particular, the information collection action required to self-learning establish or update the relationship between the load torque and the moment inertia does not affect the operation of the outer-loop control and the inner-loop control of the motor drive system and the drive control of the motor. In other words, the parameter estimator only acquires the information of the outer-loop control and the inner-loop control to estimate the value of the moment inertia $J_m$, and does not interfere with the operation of the outer-loop control and the inner-loop control and the drive control of the motor. Furthermore, when the parameter estimator acquires the value of the moment inertia $J_m$, the parameters of the controller may be adjusted according to the value of the moment inertia $J_m$, to control the operation of the motor, thereby precisely controlling the speed of the motor to increase the control performance of the motor, such as the acceleration performance, transient response, load rejection capability, and so on.

In summary, the present disclosure has the following features and advantages:
1. Calculating the value of the corresponding values of the moment inertia by using an integral operation to solve the problem of needing to add a filter due to the high frequency noise caused by the differential operation in the prior art.
2. Using the existing speed control loop and current control loop to directly acquire the information needed for parameter estimation, and therefore the parameter (moment inertia) estimation process does not affect the operation of the closed loop and the drive control of the motor.

3. When the value of the moment of inertia is acquired by parameter estimation, the parameters of the controller can be adjusted according to the value of the moment inertia to control the operation of the motor, thereby precisely controlling the speed of the motor to increase the control performance of the motor, such as the acceleration performance, transient response, load rejection capability, and so on.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of speed control based on a self-learning model of a load torque and a moment inertia applied to a controller of controlling a motor, the method comprising steps of:
   (a) establishing a relationship between the load torque and the moment inertia by a self-learning manner, wherein the step (a) comprises steps of:
   (a1) acquiring the value of the load torque under a zero speed control that a speed of the motor is zero,
   (a2) acquiring a value of the moment inertia under an acceleration control that the speed of the motor gradually rises from zero, and
   (a3) establishing the relationship between the load torque and the moment inertia by repeatedly performing the step (a1) and the step (a2),
   (b) correspondingly acquiring the value of the moment inertia according to a value of the load torque, and
   (c) adjusting parameters of the controller to control rotation of the motor according to the value of the moment inertia.

2. The method of speed control based on the self-learning model of the load torque and the moment inertia as claimed in claim 1, wherein the step (a2) comprises a step of:
   (a21) calculating the value of the moment inertia by performing an integral operation.

3. The method of speed control based on the self-learning model of the load torque and the moment inertia as claimed in claim 1, wherein the relationship between the load torque and the moment inertia is a lookup table.

4. The method of speed control based on the self-learning model of the load torque and the moment inertia as claimed in claim 1, wherein the relationship between the load torque and the moment inertia is a curve-fitting relation.

5. The method of speed control based on the self-learning model of the load torque and the moment inertia as claimed in claim 1, further comprising a step of:
   (d) updating the relationship between the load torque and the moment inertia.

6. The method of speed control based on the self-learning model of the load torque and the moment inertia as claimed in claim 5, wherein when determining that there is a new value of the load torque, correspondingly acquiring a new value of the moment inertia and updating the relationship between the load torque and the moment inertia.

7. The method of speed control based on the self-learning model of the load torque and the moment inertia as claimed in claim 3, wherein a relationship between the load torque and the moment inertia is one to one.

8. The method of speed control based on the self-learning model of the load torque and the moment inertia as claimed in claim 3, wherein when a relationship between the load torque and the moment inertia is one to many, the plurality of moment inertia is calculated by an arithmetic average operation to acquire an average moment inertia, and a relationship between the load torque and the average moment inertia is one to one.

9. The method of speed control based on the self-learning model of the load torque and the moment inertia as claimed in claim 1, wherein in the step (a), acquiring a speed information of the motor through a speed control loop, and acquiring a torque information of the motor through a current control loop to self-learning establish the relationship between the load torque and the moment inertia.

* * * * *